UNITED STATES PATENT OFFICE.

PETER F. SCHLIECKER, OF BALTIMORE, MARYLAND, ASSIGNOR TO HIMSELF AND A. CLINTON PLANT, OF WASHINGTON, DISTRICT OF COLUMBIA.

IMPROVEMENT IN PAPER-PULP.

Specification forming part of Letters Patent No. 116,759, dated July 4, 1871.

*To all whom it may concern:*

Be it known that I, PETER F. SCHLIECKER, of the city and county of Baltimore, in the State of Maryland, have invented a new and useful Improvement in Paper-Pulp, of which the following is a specification:

The invention relates to the utilization of amianthus or asbestus, a fibrous mineral of the hornblende group, and its reduction, by grinding and maceration in chlorine water, to the condition of a pulp for the manufacture of paper.

I take the crude asbestus and reduce it by grinding to such a pulverized condition as that it can be thoroughly and intimately washed, and then wash it in water either alone or in conjunction with a jet of steam, to dissolve the alumina and disintegrate the fibers. The powdered asbestus thus washed is mixed with chlorine water in the proportion of ten gallons (10 gals.) of chlorine water to every ton of powdered asbestus. The asbestus is now thoroughly macerated, upon the completion of which operation the pulp may be taken up and used in the manufacture of paper, *papier mache*, or similar articles.

What I claim as my invention, and desire to secure by Letters Patent, is—

1. The process of preparing asbestus for use as a paper-pulp, by pulverizing, washing, and admixture with chlorine water, substantially as herein set forth.

2. A paper-pulp, consisting of pulverized and washed asbestus mixed with chlorine water, when prepared in the manner and proportions set forth.

In testimony that I claim the foregoing improvement in paper-pulp I have hereunto set my hand and seal this 1st day of June, 1871.

PETER F. SCHLIECKER. [L. S.]

Witnesses:
    JOS. T. K. PLANT,
    W. A. BOSS.